Patented Aug. 12, 1924.

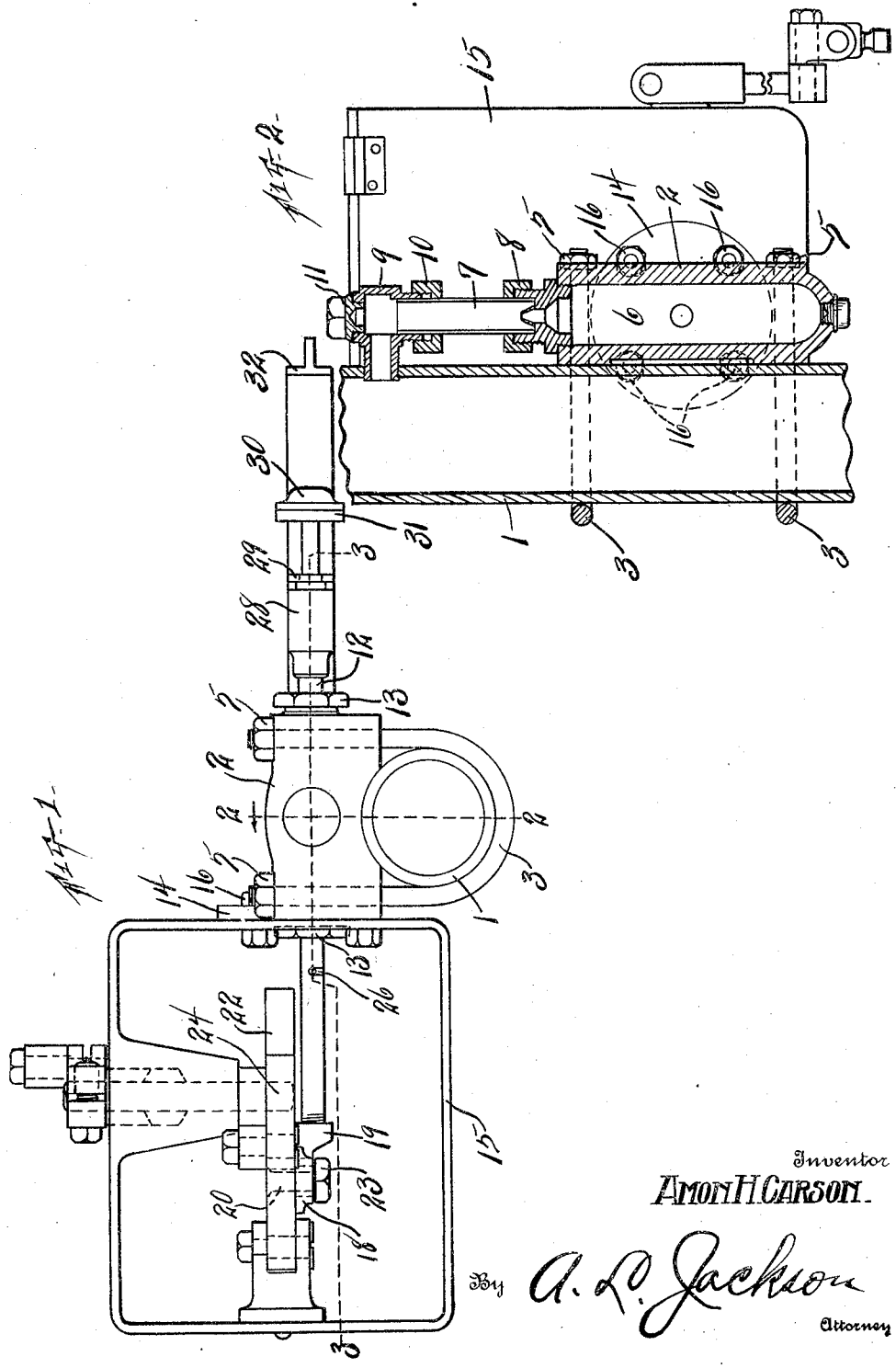

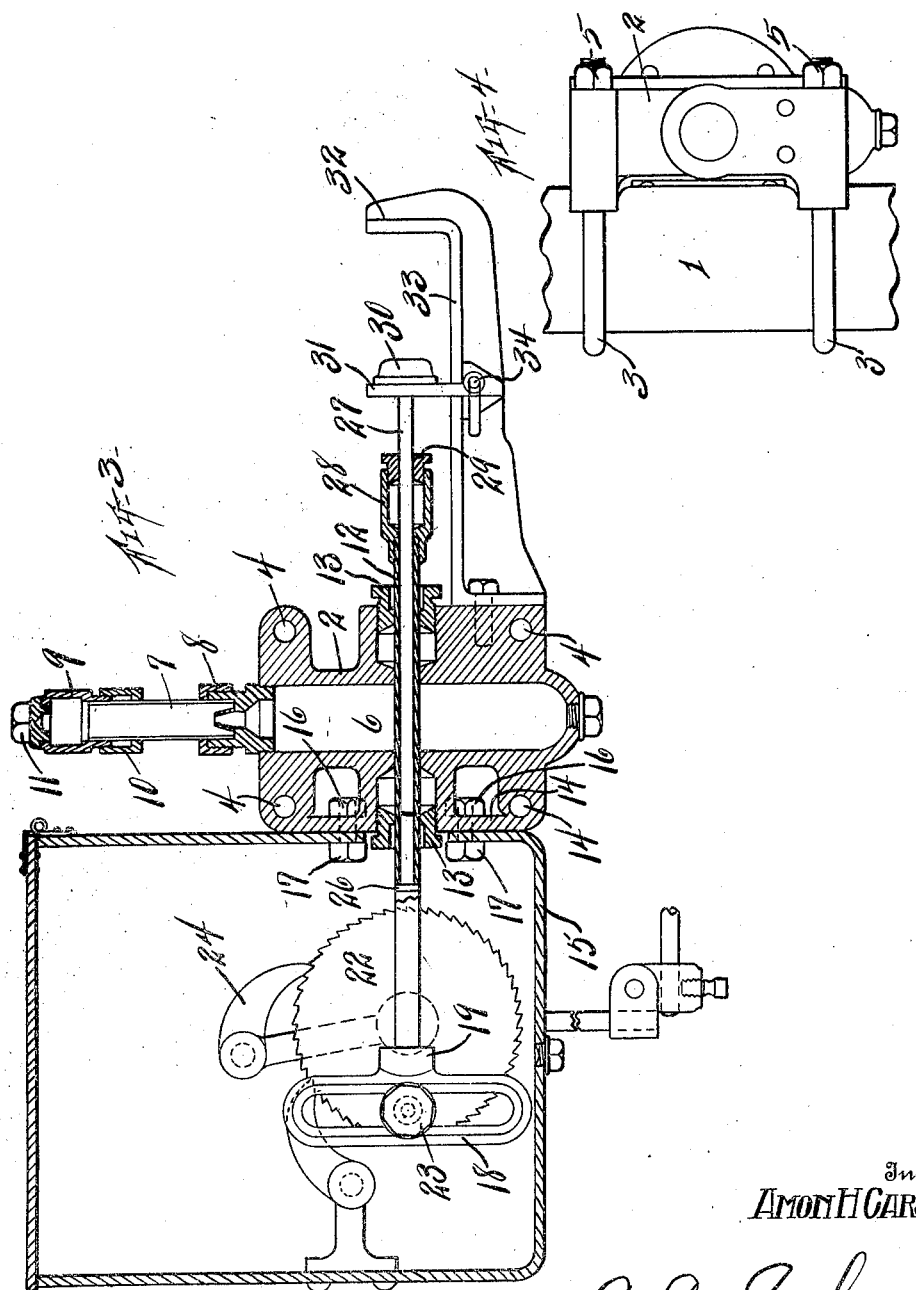

1,504,429

UNITED STATES PATENT OFFICE.

AMON H. CARSON, OF FORT WORTH, TEXAS, ASSIGNOR, BY DIRECT AND MESNE ASSIGNMENTS, TO THE VALVELESS LUBRICATOR CO., OF FORT WORTH, TEXAS, A CORPORATION OF TEXAS.

VALVELESS LUBRICATOR.

Application filed December 30, 1922. Serial No. 609,800.

*To all whom it may concern:*

Be it known that I, AMON H. CARSON, a citizen of the United States, residing at Fort Worth, in the county of Tarrant and State of Texas, have invented certain new and useful Improvements in Valveless Lubricators, of which the following is a specification.

My invention relates to lubricators and more particularly to valve lubricators; and the object is to provide a simple device for lubricating purposes and which is adapted to deliver lubricating material to steam lines and which is simple in construction and operation and which will force the lubricating material into a steam line automatically after forcing the lubricating material through water. Other objects and advantages will be fully explained in the following description and the invention will be more particularly pointed out in the claims.

Reference is had to the accompanying drawings which form a part of this application.

Fig. 1 is a plan view of the lubricating apparatus. Fig. 2 is a vertical section, taken on the line 2—2 of Fig. 1. Fig. 3 is a vertical section, taken on the line 3—3 of Fig. 1. Fig. 4 is a side elevation of the valve casing, showing the manner of attaching the same to a steam line.

Similar characters of reference are used to indicate the same parts throughout the several views.

A section 1 of a steam line pipe is shown and the valve casing 2 is attached to the steam line by U-bolts 3 which are projected through openings 4 in the valve casing casting and secured therein by nuts 5. The casing 2 has a vertical cavity 6 therein for containing oil and for permitting the passage of oil. The lubricator is provided with a sight feed valve or gage 7 which should be of transparent material. The tube 7 is connected to the casing 2 by a perforated cap 8 which is screwed on a plug which is screwed into the upper portion of the casing 2. The tube 7 is connected to a plug 9 which is tapped into the steam line 1. The upper end of the tube 7 is projected into an opening in the plug 8 and a perforated cap 10 is screwed on a reduced portion of the plug 9. This plug has a passage therethrough for lubricating material from the tube 7. Water is placed in the tube 7 and the lubricating material is forced through the water. The upper side of the plug 9 is closed by a screw plug 11. The casing 2 has a vertical passage or cavity for lubricating material and has a horizontal passage therethrough for a hollow plunger 12. Packing glands 13 are provided for the plunger 12. The casting or casing 2 has a circular flange member 14 formed integral therewith and the lubricator reservoir 15 is attached to the member 14 by bolts 16 and nuts 17. One of the packing glands 13 projects through the side of the casing of the reservoir 15. The plunger 12 is formed by boring the cavity in a rod, and the rod is extended and connected to a yoke or loop 18 which has a threaded boss 19 which is screwed on the end of the plunger rod. A wrist pin 20 projects through the loop 18 and is rigid with a ratchet wheel 22. The loop 18 is prevented from leaving the pin 20 by a nut 23. The wheel 22 is driven by a pawl 24 which may be actuated by any suitable driving mechanism. A locking pawl 25 is provided to aid in preventing backward turning of the wheel 22. As the wheel 22 is driven the plunger 12 will be actuated. The plunger 12 has an intake opening 26 to receive lubricating material which is placed in the reservoir 15. A supplemental plunger rod 27 operates in the plunger 12. A packing gland 28 is screwed on the plunger 12 and a perforated plug 29 closes the end of the packing gland 28. The plunger rod 27 has a head 30 which moves between two stops 31 and 32. The rod 27 moves freely through the stop 31, which serves as a bearing and guide for the plunger rod.

In operation, the plunger 12 is reciprocated regularly for delivering lubricating material from the reservoir 15 to the cavity 6. On the inward drive to get a charge of material, the plunger 12 is thrust far enough into the reservoir to secure a charge through the inlet 26. The plunger 27 will stop when the head 30 comes against the stop 31, and this takes place before the plunger 12 reaches the end of its travel. This will tend to create a vacuum in the plunger 12 and this will cause a charge of lubricating material to be drawn through the inlet 26, into the plunger 12. On the outward stroke, the two plungers will travel together until the head 30 strikes the stop 32. This is before the plunger 12 reaches the end of its travel outwardly. The plunger 27 will then force the lubricating material out of the opening 26 into the cavity 6 and the plunger 27 is then filling the entire opening in plunger 12. When the plunger 12 is driven back inwardly, the two plungers will travel together until the head 30 of plunger 27 strikes the stop 31. This will again form a vacuum in the plunger 12 and the operation will be as above described. The stop 31 is adjustably mounted on the bracket 33 by an eccentrically positioned bolt 34.

Various changes in the sizes, proportions, and construction and arrangement of the several parts may be made without departing from my invention.

The lubricating material is forced upwardly through the water in the gage 7 and from the gage into the steam line 1. In this way, the lubricating material is delivered without too much heat.

What I claim, is,—

1. A lubricator for supplying the lubricant to a steam line comprising a supply reservoir, cooling means between said reservoir and the steam line consisting of a casing and a combined water reservoir and sight feed in communication with said casing and with said steam line, a hollow plunger reciprocating in said reservoir and through said casing and discharging the lubricant in said casing and provided with an inlet and outlet opening, a supplemental plunger mounted in said hollow plunger and moving therewith for part of the travel of the hollow plunger, means for stopping the supplemental plunger for creating a vacuum in said hollow plunger for causing an intake of lubricant, and means for stopping the travel of said supplemental plunger before said hollow plunger, whereby said supplemental plunger drives the lubricant from said hollow plunger.

2. A lubricator for supplying the lubricant to a steam line comprising a supply reservoir, cooling means between said reservoir and the steam line consisting of a casing and a combined water reservoir and sight feed in communication with said casing and with said steam line, a hollow plunger reciprocating in said reservoir and to the point of discharge of the lubricant in said casing, a supplemental plunger mounted in said plunger and moving therewith during a part of each travel of the hollow plunger and adapted to create a vacuum therein for causing an intake of lubricant and adapted to discharge the lubricant, and stops for controlling the movements of said supplemental plunger.

3. A lubricator for supplying the lubricant to a steam line comprising a supply reservoir, cooling means between said reservoir and the steam line consisting of a casing and a combined water reservoir and sight feed in communication with said casing and with said steam line, a hollow plunger reciprocating in said reservoir and to the point of discharge of the lubricant in said casing and provided with an inlet and discharge opening, a supplemental plunger mounted in said hollow plunger and moving therewith during a part of its travel and adapted to create a vacuum in said hollow plunger for causing an intake of lubricant on the inward thrust of said hollow plunger and adapted to discharge the lubricant from said hollow plunger on the outward thrust of said plungers, and stops for regulating the thrusts of said supplemental plunger.

4. A lubricator for supplying the lubricant to a steam line comprising a supply reservoir, cooling means between said reservoir and the steam line consisting of a casing and a combined water reservoir and sight feed in communication with said casing and with said steam line, a hollow plunger adapted to reciprocate in said reservoir and to the point of discharge of the lubricant in said casing and provided with an inlet and discharge opening, a supplemental plunger mounted in said hollow plunger and projecting therefrom and moving with said hollow plunger and adapted to create a vacuum in said hollow plunger for causing an intake of lubricant and adapted to discharge said lubricant therefrom, an adjustable stop for limiting the inward thrust of said supplemental plunger and for varying the travel limit of said supplemental plunger for varying the amount of lubricant fed at each thrust of the plunger, and a stop for said supplemental plunger on its outward thrust for causing said plunger to discharge the lubricant from said hollow plunger.

5. A lubricator for supplying a lubricant to a steam line at regular intervals comprising a supply reservoir and a cooling medium interposed between said reservoir and said steam line, a reciprocating hollow plunger for receiving lubricant, a supplemental plunger mounted in said plunger for creating a vacuum in said hollow plunger for causing an intake of lubricant and adapted to discharge the lubricant from said hollow plunger into said cooling medium, and stops for regulating the inward and outward thrusts of said hollow plunger and the stop for the inward thrust of said supplemental plunger being adjustable for varying the amount of lubricant to be taken into said hollow plunger.

6. A lubricator comprising a reservoir, a casing rigid with said reservoir and provided with a cavity therein, a sight feed gage having communication with said cavity and with a steam line, a hollow plunger reciprocating in said casing and into said reservoir and provided with an inlet and discharge opening, a supplemental plunger mounted in and movable with said hollow plunger, a stop for said supplemental plunger for causing said supplemental plunger to stop before said hollow plunger stops, said stop being adjustable for varying the travel of said supplemental plunger on the inward thrust, a stop for causing said supplemental plunger to stop before the hollow plunger stops for causing a discharge of the lubricant from said hollow plunger into said cavity.

In testimony whereof, I set my hand, this 12th day of December, 1922.

AMON H. CARSON.